United States Patent [19]
Jaggers

[11] Patent Number: 5,163,693
[45] Date of Patent: Nov. 17, 1992

[54] TOP JAW AND WEDGE CONNECTOR

[75] Inventor: James R. Jaggers, Ft. Lauderdale, Fla.

[73] Assignee: DL&J, Inc., Fort Lauderdale, Fla.

[21] Appl. No.: 774,826

[22] Filed: Oct. 11, 1991

Related U.S. Application Data

[63] Continuation-in-part of Ser. No. 681,714, Apr. 8, 1991, Pat. No. 5,076,596.

[51] Int. Cl.$^5$ .............................................. B23B 31/16
[52] U.S. Cl. ..................... 279/124; 279/153
[58] Field of Search .......... 279/1 SJ, 110, 123, 279/124, 152, 153

[56] References Cited

U.S. PATENT DOCUMENTS

| | | | |
|---|---|---|---|
| 2,667,358 | 1/1954 | Highberg | 279/123 |
| 3,219,356 | 11/1965 | Wilterdink et al. | 279/123 |
| 3,744,808 | 7/1973 | Hughes | 279/123 X |
| 4,640,518 | 2/1987 | Ferraro | 279/123 |
| 5,076,596 | 12/1991 | Jaggers | 279/123 |

*Primary Examiner*—Steven C. Bishop
*Attorney, Agent, or Firm*—Malin, Haley, McHale, DiMaggio & Crosby

[57] ABSTRACT

A top jaw system for securing a top jaw in position above a chuck on a milling machine, lathe or the like is provided. A protrusion extends upward from the chuck and is preferably attached to the chuck by rigid attachment to a jaw nut which is positioned in a common master jaw on the chuck. The protrusion has a pair of flat faces which extends upward and over the jaw nut to form acute angles with the jaw nut. A top jaw having a slot sized to receive the protrusion is placed over the protrusion. The top jaw has a pin aperture extending through the top jaw through the slot at a right angle to the protrusion when the top jaw is placed on the protrusion. When the top jaw is placed on the protrusion, an elongated pin having a pair of flat surfaces extending along its elongated axis is placed in the pin aperture. One of the flat faces of the protrusion is pushed into contact with one of the flat surfaces of the pin. This is preferably done by the movement of the master jaw by hydraulic means attached to the master jaw. When the master jaw is moved by the hydraulic device, pressure is applied to the contact between one of the flat faces of the protrusion and one of the flat surfaces of the pin. Because of the acute angle formed by the flat face, this pressure causes the protrusion to ride up over the pin raising the jaw nut into contact with the master jaw. Simultaneously, downward pressure is applied to the top jaw through the pin to clamp the top jaw onto the top of the master jaw.

3 Claims, 2 Drawing Sheets

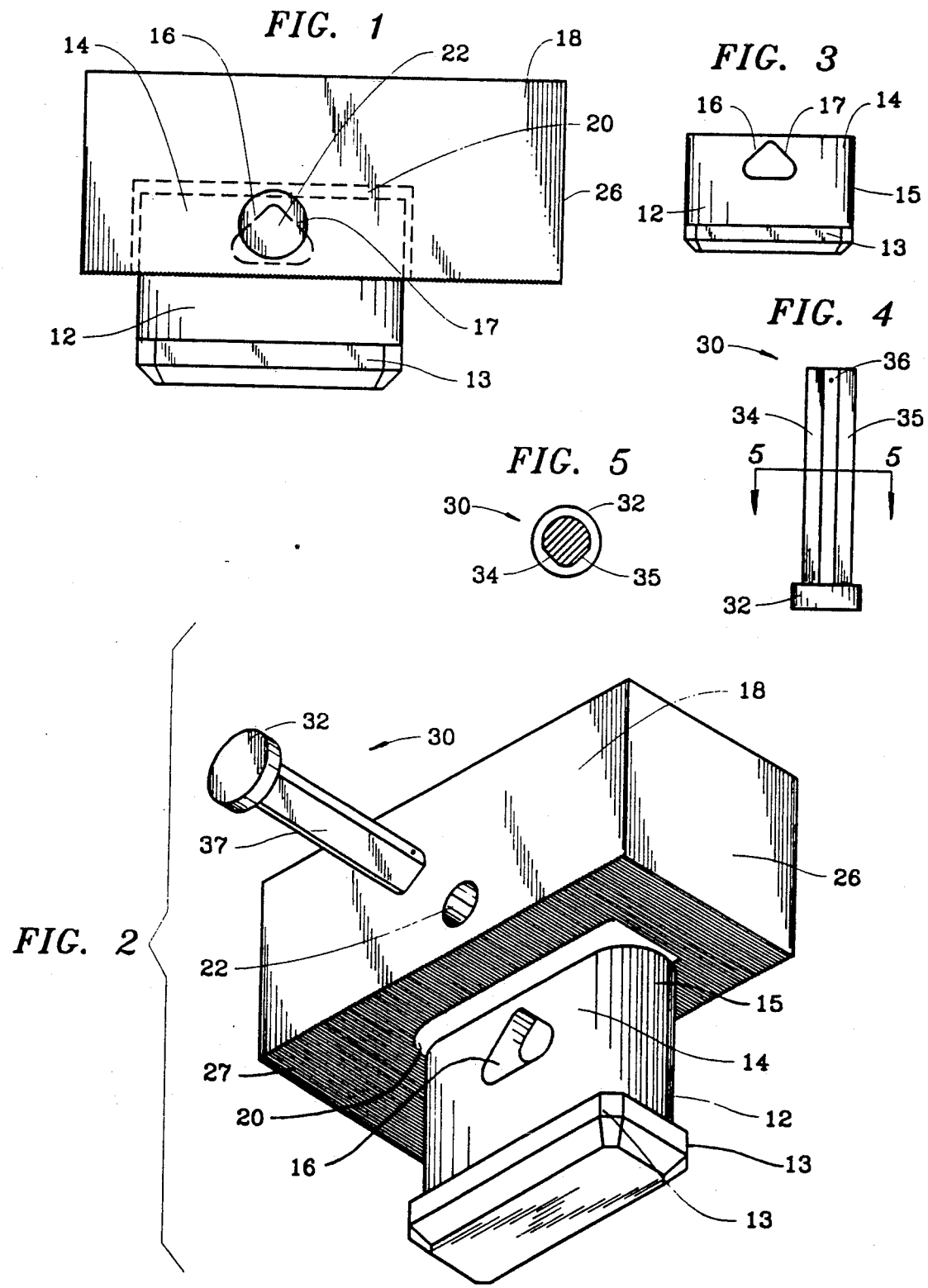

TOP JAW AND WEDGE CONNECTOR

This application is a continuation-in-part of U.S. patent application Ser. No. 07/681,714 filed Apr. 8, 1991, now U.S. Pat. No. 5,076,596.

BACKGROUND OF THE INVENTION

1. Field of the Invention

The instant invention relates to top jaws for use on chucks on lathes, milling machines and the like and more particularly to top jaws which can be easily and rapidly interchanged without removing the means by which the top jaw is attached to the chuck.

2. Description of the Related Art

In the art, chucks on milling machines, lathes or the like typically have channels cut into their outer surface. These channels extend radially outward from the center of the chuck. Master jaws are placed in the channels and attached to hydraulic means for moving the master jaws along the channels. These master jaws typically have inverted T-shaped channels extending along their lengths for receiving and securing jaw nuts which are in turn connected to the top jaws.

A jaw nut corresponding in shape to the inverted T-shaped channel of the master jaw is slid along the master jaw to a desired position on the chuck. A top jaw is typically placed on the top surface of the jaw nut above the plane of the outer surface of the chuck. Removable bolts extend downward through the top jaw into threaded recesses in the jaw nut. Upon tightening the bolts, the top jaw is drawn downward into contact with the top surface of the master jaw while the jaw nut is drawn upward into contact with channel in the master jaw. This process locks the top jaw in position on the master jaw.

In order to replace the prior art top jaws, these bolts are removed allowing the top jaw to be pulled away from contact with the upper surface of the jaw nut and master jaw. A new top jaw is positioned above the jaw nut and bolts are passed through the top jaw into contact with the threaded recesses in the jaw nut. The bolts ar tightened drawing the top jaw into contact with the upper surface of the master jaw and the jaw nut into contact with the contours of the T-shaped channel.

Aligning and re-threading the bolts through the top jaw into the jaw nut requires considerable manipulation and precise alignment. For this reason the changing of a top jaw is time consuming and is often very difficult. This is a problem in want of a solution.

SUMMARY OF THE INVENTION

A wedge-shaped projection called a wedge, having a pair of flat angled contact faces, is provided. The wedge is placed on the top of a conventional jaw nut which is in turn placed within a conventional master jaw of a chuck. The angled contact faces are angled upward and over the jaw nut so that an acute angle is formed between the respective angled contact face and the top of the jaw nut.

A top jaw having a slot corresponding in size to the wedge is provided. The top jaw is placed on the wedge so that the wedge extends upward into the slot of the top jaw. The top jaw has a pin aperture extending through the slot parallel to the angled contact faces of the wedge. A pin having a plurality of flat angled surfaces along its longitudinal length is placed through the pin aperture in the top jaw. When the pin is placed in position within the pin aperture and the wedge pushed toward the pin, one of the angled surfaces of the pin contacts one of the angled contact faces of the wedge.

In replacing the top jaw, the pin is removed from the pin aperture. Then the top jaw may be lifted off the wedge and away from the master jaw. Thereafter, a new top jaw having a slot and pin aperture is inserted over the wedge. The pin is replaced through the pin aperture exactly as before so that one of the flat angled surfaces of the pin comes into contact with one of the angled contact faces of the wedge. This contact between the wedge and pin holds the new top jaw in position above the master jaw as described above.

With the instant invention, the process of exchanging top jaws is speeded substantially. With the prior art top jaws about ten minutes was needed to change the top jaws. With the instant invention, considerably less time is needed to change top jaws. Further, because there is no need for precise alignment of bolts and recesses, the ease with which top jaws are exchanged is greatly improved.

In view of the foregoing, and in consideration of the following detailed description, it is an object of the instant invention to provide a top jaw system which allows one top jaw to be easily exchanged with another top jaw.

It is another object of the instant invention to provide a top jaw which may be rapidly exchanged with another top jaw.

It is a further object of the instant invention to provide a top jaw which may be easily aligned along the master jaw.

It is a further object of the instant invention to provide a top jaw which is inexpensive and easy to manufacture.

These and other objects will become obvious from the following detailed description in which like elements are referred to by like numerals.

BRIEF DESCRIPTION OF THE DRAWINGS

FIG. 1 is a side elevational view of the invention showing the wedge and slot in phantom.

FIG. 2 is an exploded view of the invention of FIG. 1.

FIG. 3 is a side elevational view of the jaw nut and wedge of the invention of FIG. 1.

FIG. 4 is a perspective view of the pin used in conjunction with the invention.

FIG. 5 is a cross-sectional view taken along line 5—5 of FIG. 4.

DETAILED DESCRIPTION OF THE INVENTION

Figure 6:
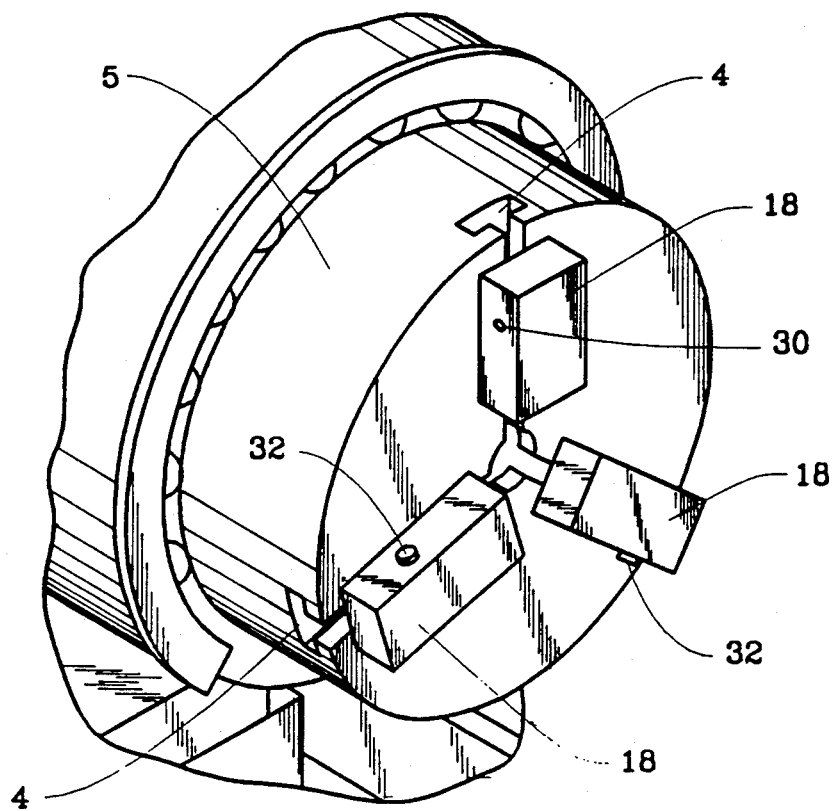
FIG. 6 is a rear elevational view of the invention of FIG. 1 in position on a master jaw attached to a chuck.
Figure 7:
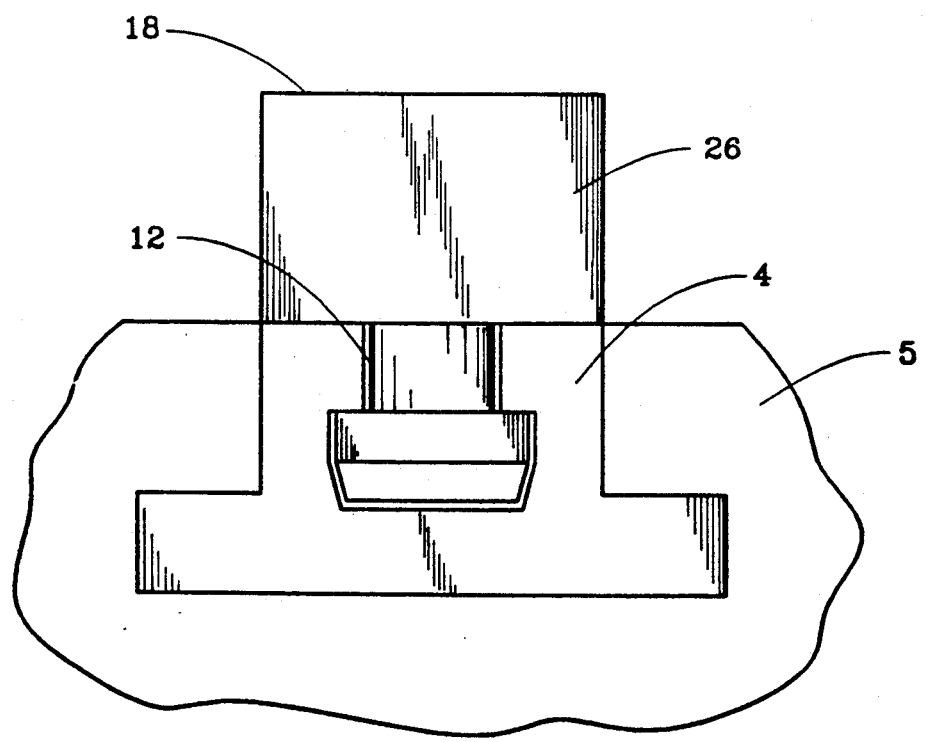
FIG. 7 is a perspective view of the top jaws in position on a chuck.

Referring first to FIG. 2, an exploded view of the instant invention is shown. The invention includes a jaw nut 12 having a pair of outwardly extending flanges 13 and an upwardly protruding wedge 14. Wedge 14 and flanges 13 can be integrally formed with jaw nut 12. The jaw nut 12 and extending flanges 13 are shaped as is common in the art to conform to the inverted "T"-shaped channel of a master jaw 4 on a chuck 5 (FIG. 6). The use of a "T" shaped channel master jaw is well known for securing top jaws in conjunction with a wedge and jaw nut and is described in my copending U.S. patent application Ser. No. 07/681,714, now U.S. Pat. No. 5,076,596, the disclosure of which is incorporated herein by reference as though fully set forth herein.

A top jaw 18 is provided having an elongated slot 20 extending into top jaw 18 from the side of the top jaw 18 directed toward the chuck. The elongated axis of slot 20 is parallel to the axis of the master jaw when top jaw 18 is in position on the master jaw as will be described. A pin aperture 22 extends entirely through top jaw 18 passing through slot 20 at a right angle to the elongated axis of slot 20. Top jaw 18 has at least one work piece end 26 configured to contact and hold a work piece (not shown) when top jaw 18 is attached to the master jaw. A pin 30 is also provided as will be described in detail hereafter. Top jaw 18 contains a series of serrations 27 along its lower surface. These serrations 27 comprise essentially right-triangular protrusions arranged in parallel along the lower surface of top jaw 18 and extending across the lower surface of top jaw 18. Serrations 27 correspond in size and shape to right-triangular serrations (not shown) on master jaw 4. The serrations of master jaw 4 extend into the corresponding triangular shaped spaces between serrations 27 of top jaw 18, thereby preventing top jaw 18 from moving forward or backward in a direction perpendicular to serrations 27.

As shown in FIG. 3, the wedge 14 has a back 15 on one end and a pair of angled contact faces 16 and 17. Contact faces 16 and 17 are flat and extend entirely across the surface of wedge 14. Contact faces 16 and 17 are located within wedge 14. Contact faces 16 and 17 extend upward from the top of jaw nut 12 at acute angles relative to the top surface of jaw nut 12 respectively.

Slot 20, as shown in FIGS. 1 and 2, is slightly larger in length and approximately the same width as wedge 14. In operation, top jaw 18 is placed over wedge 14 so that wedge 14 extends into slot 20.

Pin 30 has a pair of flat angle faces 34 and 35 (FIG. 4) extending entirely along the length of pin 30. Pin 30 also has a pin head 32 which is larger in cross sectional circumference than pin 30. When top jaw 18 is placed on wedge 14 so that wedge 14 extends into slot 20, pin 30 is placed through pin aperture 22 in top jaw 18 so that one of the angles faces 34 and 35 of pin 30 comes in contact with the respective flat contact face 16 or 17 of wedge 14. Pin 30 is manually pushed through pin aperture 22 so that pin head 32 comes in contact with the outside surface of top jaw 18. Contact between pin head 32 and top jaw 18 prevents pin 30 from passing entirely through pin aperture 22.

Each master jaw on the chuck is attached to hydraulic devices, as is common in the art, for moving the master jaws along the recesses in the chuck. The movement of the master jaw by its respective hydraulic device pushes wedge 14 toward pin 30. Because of the angled contact face 16 or 17 of wedge 14, wedge 14 tends to rise upward with respect to pin 30. The upward movement of wedge 14 correspondingly moves jaw nut 12 upward. This upward movement of jaw nut 12 moves flanges 13 into contact with the corresponding channels of the master jaw. This brings jaw nut 12 into solid and secure contact with master jaw 4.

The upward movement of wedge 14 puts downward pressure on pin 30 which is transferred to top jaw 18 through the contact of pin 30 with pin aperture 22. This downward pressure on top jaw 18 places top jaw 18 into contact with the upper surface of the master jaw. Therefore, the continued movement of the master jaw in the same direction, top jaw 18 moves downward into contact with the top surface of the master jaw while jaw nut 12 moves upward in the master jaw so that the entire device is securely positioned above the master jaw.

The angle of contact faces 16 and 17 to the upper surface of jaw nut 12 is chosen so that the movement of the master jaw causes wedge 14 to produce both forward and downward pressure on pin 30. The forward pressure moves contact face 16 or 17 toward pin 30. The downward pressure pushes pin 30 toward the upper surface of the master jaw. Downward pressure on pin 30 produces a corresponding upward pressure on wedge 14 which is transferred to jaw nut 12.

As the angle of the contact faces 16 and 17 to the top of jaw nut 12 approaches one hundred and twenty (120) degrees, the amount of downward pressure applied to top jaw 18 and corresponding upward pressure applied to jaw nut 12 is minimized. On the other hand, as the angle of contact faces 16 and 17 to top of jaw nut 12 approaches zero, the master jaw must be moved in the same direction a relatively large distance to produce sufficient downward force on top jaw 18 and upward force on jaw nut 12 to securely clamp the device above the master jaw. In practice, an angle for contact faces 16 and 17 of sixty (60) degrees has been found particularly effective. However, it is recognized that considerable variation in this angle is permitted by the invention according to the individual needs to which the device is subjected. The important factor is that the movement of wedge 14, by the movement of the master jaw, causes both downward and forward pressure to be applied on pin 30 through wedge 14.

Each top jaw 18 has at least one work piece end 26 configured to contact and hold a work piece when the master jaws are moved along the recesses in the chuck. For most applications, the work piece will be located at the center of the chuck so that the master jaws will move toward the center of the chuck thereby pushing work piece end 26 of top jaws 18 into contact with the workpiece. However, for grasping the interior of pipes and the like, work piece end 26 may be directed away from the center of the chuck and the master jaws move outward of the chuck allowing the inside surface of the work piece pipe or similar item to be grasped.

Therefore, the movement of the master jaw inward will cause pin 30 to contact one of the contact faces 16 and 17 and securely position the device above the master jaw, as described above. Accordingly, the movement of the master jaw outward will cause pin 30 to contact the other of the two contact faces 16 and 17, which will produce the same effect on device as when moving the master jaw inward.

When it is desired to replace a top jaw 18 with an alternate top jaw 18, the pressure on pin 30 is reduced accordingly to allow pin 30 to be removed from pin aperture 22 in top jaw 18. With pin 30 removed, top jaw 18 may be lifted off of wedge 14. Thereafter, a new top jaw having a slot as described above may be placed over wedge 14. The original or a new pin is placed through the pin aperture in the new top jaw so that one of the angle faces of the pin contacts the one of the contact faces 16 and 17 of wedge 14. Thereafter, the master jaw is moved either inward or outward as described above. The movement of the master jaw, as described above, tightens the new top jaw and jaw nut 12 in position above the master jaw exactly as described above.

The entire procedure for replacing one top jaw 18 with another can be rapidly and easily accomplished by the instant invention and does not require the precise alignment and manipulation of bolts into threaded apertures in the jaw nuts as had previously been required. Additionally, no tools are needed in replacing and locking top jaw 18 to master jaw 4. Accordingly, the time required to change a top jaw has been greatly reduced from prior art devices.

The instant invention has been described in connection with specific embodiments. It is recognized that changes and modifications may be made to the description given above and still be with the scope of the invention as claimed. Further, it is clear that obvious changes and modifications will occur to those skilled in the art.

What is claimed is:

1. A top jaw system for securing a top jaw in position above a chuck comprising:
   a wedge protrusion extending upward from the chuck, said protrusion having a top surface and a bottom surface, said protrusion having a pair of flat angled contact faces and a bottom flat face, said pair of flat angled contact faces directed along radials extending outward from the center of the chuck, each of said angled contact faces forming an acute angle with said bottom flat face of said protrusion, said pair of flat angled contact faces and said bottom flat face defining a substantially triangular shaped aperture extending through said protrusion;
   means, attached to said protrusion, for attaching said protrusion to the chuck;
   an elongated pin having a pair of flat surfaces extending along said pin parallel to the elongated axis of said pin;
   a top jaw having a face disposed toward the chuck, said top jaw having a slot sized to receive said protrusion, said slot extending from the face of said top jaw into said top jaw said top jaw also having a pin aperture sized to receive said pin, said pin aperture extending through said top jaw and through said slot, said pin aperture extending through said top jaw at a right angle to said pair of angled contact faces when said protrusion is positioned in said slot; and
   means for moving one of said pair of angled contact faces into contact with one of said pair of flat surfaces of said pin when said protrusion is positioned in said slot and said pin is placed in said pin aperture;
   whereby said top jaw is placed over said protrusion so that said protrusion extends into said slot and said pin is placed through said pin aperture, whereafter one of said pair of flat surfaces of said pin comes into contact with one of said pair of angled contact faces of said protrusion when said means for moving said pair of angled contact faces moves one of said pair of contact faces into contact with one of said pair of flat surfaces of said pin thereby causing one of said pair of angled contact faces of said protrusion to move upward over said pin thereby placing downward pressure on said pin and said top jaw and simultaneous upward pressure on said means for attaching said protrusion to said chuck.

2. The system of claim 1 wherein said means for attaching said protrusion to the chuck includes:
   a master jaw placed in recesses in the chuck, said master jaw having a channel extending along its length; and
   a jaw nut integrally formed with and depending from the bottom surface of said protrusion, said jaw nut shaped to correspond to the channel in said master jaw so that said jaw nut may be moved along the channel in said master jaw constrained in its movement by the boundaries of the channel.

3. The system of claim 1 wherein said pin includes a pin head having a diameter larger than said pin aperture whereby said pin head contacts said top jaw thereby locating said pin in said pin aperture.

* * * * *